United States Patent
Iwatsubo et al.

(10) Patent No.: US 7,052,752 B2
(45) Date of Patent: May 30, 2006

(54) CONTAINER FOR OXIDATION DYE

(75) Inventors: Mitsugu Iwatsubo, Tokyo (JP); Yuuji Yamaguchi, Kanagawa (JP); Takurou Ito, Kanagawa (JP)

(73) Assignee: Kao Corporation, Tokyo (JP)

( * ) Notice: Subject to any disclaimer, the term of this patent is extended or adjusted under 35 U.S.C. 154(b) by 70 days.

(21) Appl. No.: 10/662,507

(22) Filed: Sep. 16, 2003

(65) Prior Publication Data

US 2005/0058792 A1 Mar. 17, 2005

(51) Int. Cl.
*B32B 7/00* (2006.01)
*C09K 15/04* (2006.01)

(52) U.S. Cl. .................. 428/36.6; 428/36.7; 428/515; 428/523

(58) Field of Classification Search .............. 428/36.6, 428/36.7, 515, 523, 35.7, 518
See application file for complete search history.

(56) References Cited

U.S. PATENT DOCUMENTS 5,153,039 A * 10/1992 Porter et al. ............. 428/36.92

FOREIGN PATENT DOCUMENTS

| JP | 06-080150 | 10/1997 |
|----|-----------|---------|
| JP | 11-005721 | 1/1999  |

* cited by examiner

*Primary Examiner*—Sandra M. Nolan-Rayford
(74) *Attorney, Agent, or Firm*—Oblon, Spivak, McClelland, Maier & Neustadt, P.C.

(57) ABSTRACT

A blow molding multilayered resin container used for holding contents containing an oxidation dye which comprises a moisture barrier layer having a water vapor transmission rate of 0.4 g·mm/(m²·d) or lower and an oxygen barrier layer having an oxygen transmission rate of 10 cm³·mm/(m²·d·MPa) or lower, the oxygen barrier layer being closer to the outside of the container than the moisture barrier layer.

4 Claims, 1 Drawing Sheet

CONTAINER FOR OXIDATION DYE

BACKGROUND OF THE INVENTION

The present invention relates to a container for contents containing an oxidation dye, such as a hair dye.

Japanese Patent 2670216 discloses a tubular container comprising a neck and a tubular body thermally bonded together. The neck of the tubular container is made of a composition comprising a polyolefin resin, an ethylene-vinyl acetate copolymer saponification product having a melting point of 135° C. or higher, and an ethylene-vinyl acetate copolymer saponification product having a melting point of 130° C. or lower. The tubular body is composed of an inner layer of a polyethylene resin, an intermediate layer of an ethylene-vinyl acetate copolymer saponification product, and an outer layer of a polyethylene resin.

The present inventors have revealed that the tubular container holding contents containing an oxidation dye, such as a hair dye, turns black when stored for a long time to have its appearance seriously deteriorated. It has also been found that the contents suffer from denaturation with this blackening of the container.

JP-A-11-5721 discloses a tubular container for toothpaste having an innermost layer comprising an ethylene-vinyl alcohol copolymer having an ethylene content of 35 to 55 mol % and a moisture-proof resin layer comprising an ethylene-cyclo olefin copolymer which is provided on the outer side of the innermost layer. When contents containing an oxidation dye is put into the container and stored for a long period of time, the container turns black to markedly ruin the appearance similarly to the container of Japanese Patent 2670216.

An object of the present invention is to provide a container for an oxidation dye which undergoes no damage to appearance due to color change even when stored for a long time with contents containing an oxidation dye put therein.

Another object of the present invention is to provide a container for an oxidation dye which does not cause denaturation of such contents contained therein.

SUMMARY OF THE INVENTION

The present inventors have found that the above objects are accomplished by a resin container having a multilayer structure comprising a moisture barrier layer having a specific water vapor transmission rate and an oxygen barrier layer having a specific oxygen transmission rate, the moisture barrier layer being closer to the inside of the container, and the oxygen barrier layer being closer to the outside of the container.

The present invention has been completed based on this finding. The present invention provides a blow molding multilayered resin container used for holding contents containing an oxidation dye which comprises a moisture barrier layer having a water vapor transmission rate (hereinafter abbreviated as WVTR) of 0.4 g·mm/(m$^2$·d) or lower and an oxygen barrier layer having an oxygen transmission rate (hereinafter abbreviated as OTR) of 10 cm$^3$·mm/(m$^2$·d·MPa) or lower, the oxygen barrier layer being closer to the outside of the container than the moisture barrier layer.

BRIEF DESCRIPTION OF THE DRAWINGS

The present invention will be more particularly described with reference to the accompanying drawings, in which.

DETAILED DESCRIPTION OF THE PREFERRED EMBODIMENTS

Figure 1:
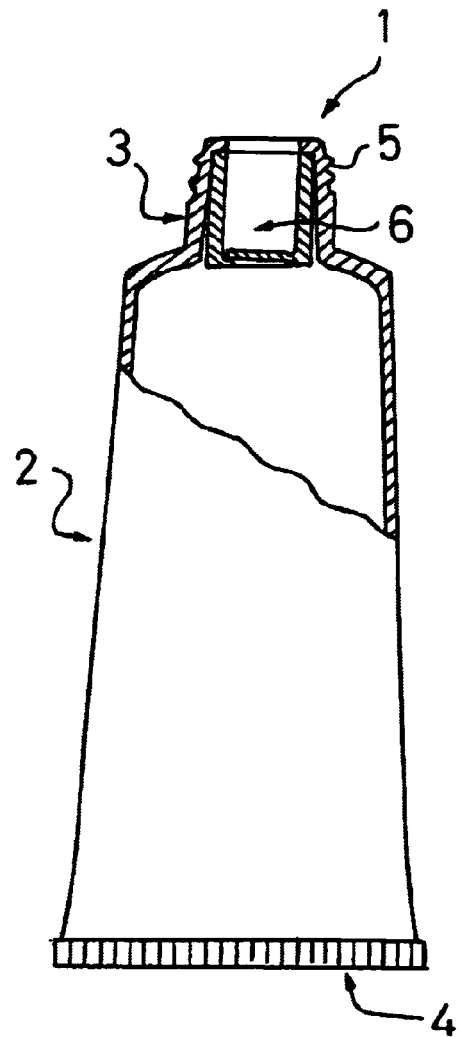
FIG. 1 is a schematic view of an embodiment of the container according to the present invention, with part cut away.

FIG. 1 shows a tubular container 1 as an embodiment of the container according to the present invention. The tubular container 1 has a body 2 formed of a tube made of synthetic resins and a cylindrical nozzle 3 made of synthetic resins. The nozzle 3 connects to one end of the body 2 to make one piece. The other end of the body 2 is heat sealed into a flattened shape to form an end seal 4. The nozzle 3 has threads 3 on its outer side, on which a cap (not shown) is screwed. The nozzle 3 is equipped with a check valve mechanism 6.

Figure 2:
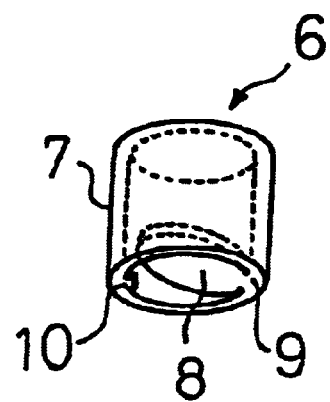
FIG. 2 is a perspective view of a check valve mechanism as seen from below.

As shown in FIG. 2, the check valve mechanism 6 has a cylindrical main body 7 and a disk-shaped valzve 8. The outer diameter of the main body 7 agrees with the inner diameter of the nozzle 3. The check valve 8 is supported by a hinge 9 connected to the lower end of the inner wall of the main body 7. A nail 10 is formed on the inner wall of the main body 7 at a position opposite to the hinge 9. The nail 10 stops the valve 8 from swinging downward. Thus, the valve 8 is designed to swing freely upward from horizontal on the hinge 9.

The container 1 is of one-piece structure having the body 2 and the nozzle 3 integrally molded. Both the body 2 and the nozzle 3 have a multilayer structure made of synthetic resins. The multilayer structure comprises a moisture barrier layer having a specific WVTR and an oxygen barrier layer having a specific OTR in such an order that the moisture barrier layer is closer to the inside of the container than the oxygen barrier layer (i.e., the oxygen barrier layer is closer to the outside of the container than the moisture barrier layer). By this layer structure, the tubular container 1 holding contents containing an oxidation dye is prevented from color change, for example, blackening and reduction of appearance even when stored for a long period of time. In addition, the container 1 protects the contents from denaturation due to oxygen attack from the outside. In particular, equipping the nozzle 3 with the check valve mechanism 6 is effective in preventing air from entering the container 1 after the contents are squeezed out of the container 1 and thereby protecting the contents against denaturation. If the order of disposing the moisture barrier layer and the oxygen barrier layer is reversed, i.e., if the oxygen barrier layer is closer to the inside of the container 1 than the moisture barrier layer, expected effects are not produced as will be demonstrated in Comparative Example described later.

The moisture barrier layer has a WVTR of 0.4 g·mm/(m$^2$·d) or lower, preferably 0.15 g·mm/(m$^2$·d) or lower. With this requirement fulfilled, the oxygen barrier layer is prevented from discoloration due to moisture content of the contents held in the container and thereby prevented from reducing its barrier performance. The moisture barrier layer having a WVTR of 0.4 g·mm/(m$^2$·d) or lower, and the oxygen barrier layer having an OTR specified below, the container 1 successfully protects the contents from deterioration. The smaller the WVTR, the better. There is no particular lower limit of the WVTR. The WVTR of a moisture barrier layer is measured in accordance with ASTM F1249 (40° C., 90% RH).

The oxygen barrier layer should have an OTR of 10 cm$^3$·mm/(m$^2$·d·MPa) or lower, preferably 2 cm$^3$·mm/(m$^2$·d·MPa) or lower. With the oxygen barrier layer and the moisture barrier layer having the recited OTR and WVTR, respectively, the contents of the container are prevented from deterioration. The smaller the OTR, the better. There is no particularly lower limit for the OTR. The OTR is measured in accordance with ASTM D3985 (23° C., 0% RH).

Materials forming the moisture barrier layer include cyclo olefin polymers, biaxially stretched polypropylene, unstretched polypropylene, and high-density polyethylene. Cyclo olefin polymers are preferred for their high moisture barrier performance and molding properties. Useful cyclo olefin polymers include ethylene-cyclo olefin copolymers and cyclo olefin homopolymers. The cyclo olefin includes bicyclo[2.2.1]hept-2-ene, tetracyclo[$4.4.0.1^{2,5}.1^{7,10}$]-3-dodecene, hexacyclo[$6.6.1.1^{3,6}.1^{13,20}.0^{2,7}.0^{9,14}$]-4-heptadene, and octacyclo[$8.8.0.1^{2,9}.1^{4,7}.1^{11,18}.1^{13,16}.0^{2,8}.0^{12,17}$]-9-5-dococene, and compounds derived therefrom by substitution with a lower alkyl group. Commercially available cyclo olefin polymers can be made use of. APL (a trade name), available from Mitsui Chemicals, Inc., is an exemplary cyclo olefin copolymer useful in the present invention.

Materials making up the oxygen barrier layer include an ethylene-vinyl alcohol copolymer and polyacrylonitrile. An ethylene-vinyl alcohol copolymer is preferred from its oxygen barrier performance and molding properties.

The moisture barrier layer and the oxygen barrier layer may be adjacent to each other or may have an adhesive layer therebetween. Resins which can be preferably used as an adhesive include olefin polymers modified with a carboxylic acid, such as maleic acid or maleic anhydride, or an anhydrous graft polymers thereof.

The moisture barrier layer in the body 2 preferably has a thickness of 20 to 60 μm, particularly 30 to 50 μm, for performing sufficient moisture barrier performance while assuring squeezability of the tubular container. The oxygen barrier layer in the body 2 preferably has a thickness of 20 to 50 μm, particularly 30 to 40 μm, for performing sufficient oxygen barrier performance while assuring squeezability of the tubular container. Where an adhesive layer is interposed between the moisture barrier layer and the oxygen barrier layer, the multilayer container wall in the body 2 preferably has a total thickness of 300 to 500 μm. Taking squeezability into consideration, a still preferred total thickness is 350 to 450 μm.

The multilayer structure of the container 1 may have an innermost resin layer provided on the inner side of the moisture barrier layer and/or an outermost resin layer provided on the outer side of the oxygen barrier layer. The innermost resin layer is preferably made of a polyolefin resin. A polyethylene resin innermost layer is particularly effective for securing heat sealing at the bottom and for preventing the end seal 4 from loosing. The outermost resin layer is preferably made of a polyethylene resin in view of ease of squeezing. Low-density polyethylene is particularly preferred for making the innermost layer from the standpoint of molding properties and heat sealability at the tube end.

The thickness of the innermost layer in the body 2 is preferably 100 to 300 μm, still preferably 150 to 250 μm, for heat sealability at the tube end and squeezability of the resulting container 1.

If necessary, an adhesive layer may be provided between the innermost layer and the moisture barrier layer and/or between the outermost layer and the oxygen barrier layer. The adhesive resins recited previously can be used to provide these adhesive layers.

As stated, the container 1 of the present embodiment has a one-piece structure having the body 2 and the nozzle 3 integrally molded. A container having such a structure is produced by blow molding. Specifically, a parison having the above-described multilayer structure is prepared by co-extrusion. The parison has a portion becoming a nozzle 3 and a portion becoming a body 2. The resulting parison is heated to a predetermined temperature and inflated to form a body 2. A check valve mechanism is inserted through the opening of the body 2 and fitted into the nozzle 3. Contents are fed into the body through the opening of the body. The opening of the nozzle is sealed with a sealing film, such as an aluminum laminate film, and the opening of the body 2 is heat sealed to produce a tubular container 1 with contents.

The contents which can be held in the container 1 typically include hair dyes containing an oxidation dye. The container of the present invention is suitable for both one-pack and two-pack hair dyes. One-pack hair dyes include acid dyes. Two-pack hair dyes include a combination of a dye intermediate (an alkali agent) as agent I and an oxidizing agent as agent II, which are mixed up to prepare a hair dye. The agent I comprises an alkali agent, such as ammonia, an ammonium salt, a carbonate (ammonium salt), a transition metal salt, a chelating agent or an alkanolamine; an oxidation type developer, such as a phenylenediamine or an aminophenol; a coupler for the developer; and so forth. The agent I comprising these ingredients is usually creamy.

The present invention is not limited to the above-described embodiment. For example, while the moisture barrier layer and the oxygen barrier layer in the embodiment are adjacent to each other either direction or via an adhesive layer, an arbitrary layer may be provided between the moisture barrier layer and the oxygen barrier layer to endow the container 1 with prescribed properties.

If desired, each of the resin layers constituting the multilayer structure may contain various additives, such as antioxidants, antistatics, colorants, antimicrobials, and ultraviolet absorbers.

The present invention will now be illustrated in greater detail with reference to Examples. The following Examples are presented as being exemplary of the present invention and should not be considered as limiting. Unless otherwise noted, all the percents are given by weight.

EXAMPLE 1 AND COMPARATIVE EXAMPLES 1 AND 2

A tubular container having the shape shown in FIG. 1 and the layer structure shown in Table 1 below was prepared by blow molding. The opening of the nozzle was sealed with a sealing film. A hair dye having the formulation shown below was injected into the container from the bottom opening, and the bottom opening was heat sealed. The layer thicknesses shown in Table 1 are those measured at the body of the container.

The tubular container and contents were stored at 40° C. and 75% RH for one month, and the outer appearance of the container was observed with the naked eye. Furthermore, after the container and contents were stored at 40° C. and 75% RH for six months, the preservability of the hair dye was evaluated from the loss of the alkali content and rated as follows. The results obtained are shown in Table 1.

Container Appearance:
   Good: no discoloration was observed
   Poor: blackening was observed
Hair Dye Preservability:
   Good: less than 25% of alkali loss
   Medium: 25 to 55% of alkali loss Poor: more than 55% of alkali loss

TABLE 1

| | Layer Structure * (from outside to inside) | Appearance | Hair Dye Preservability |
|---|---|---|---|
| Example 1 | LDPE/adhesive/EVOH/ adhesive/COC/adhesive/ LDPE = 200/20/35/20/45/ 20/100 μm | good | good |
| Comparative Example 1 | LDPE/adhesive/EVOH/ adhesive/LDPE = 100/20/ 25/20/190 μm | poor | medium |
| Comparative Example 2 | LDPE/adhesive/COC/ adhesive/EVOH/adhesive/ LDPE = 200/20/45/20/35/ 20/100 μm | poor | medium |

*LDPE: low density polyethylene
*EVOH ethylene-vinyl alcohol copolymer; OTR 0.5 $cm^3 \cdot mm/(m^2 \cdot d \cdot MPa)$
*COC cyclo olefin copolymer; WVTR 0.09 $g \cdot mm/(m^2 \cdot d)$
*Adhesive adhesive polyolefin resin (maleic acid graft polymer-modified polyolefin)

| Formulation of hair dye | (%) |
|---|---|
| Aqueous ammonia | 0.5 |
| Ammonium chloride | 0.5 |
| Ferrous sulfate | 15 ppm |
| Tetrasodium ethylenediaminetetraacetate | 0.1 |
| Monoethanolamine | 3.5 |
| Potassium carbonate | 2.5 |
| Toluene-2,5-diamine | 1.0 |
| Resorcin | 0.4 |
| m-Aminophenol | 0.2 |
| Cetyl alcohol | 6.0 |
| octyldodecanol | 1.0 |
| Polyoxyethylene(40) cetyl ether | 3.0 |
| Polyoxyethylene(2) cetyl ether | 3.5 |
| Liquid paraffin | 1.0 |
| Propylene glycol | 6.0 |
| Sodium sulfite | 0.5 |
| Ascorbic acid | 0.5 |
| Perfume | adequate amount |
| Hydrochloric acid | to adjust to pH 10.5 |
| Water | balance |

As is apparent from the results in Table 1, the container of the present invention undergoes no discoloration and keeps the same appearance as before the storage. The container of the invention does not cause the contents to be denatured, either. The comparison between Example 1 and Comparative Example 2, in particular, proves that reversing the positions of the cyclo olefin polymer layer (moisture barrier layer) and the ethylene-vinyl alcohol copolymer layer (oxygen barrier layer) results in great change of the container properties.

As described above, the container of the present invention undergoes no damage to its appearance due to color change even when stored for a long time with contents containing an oxidation dye put therein. The container of the present invention for an oxidation dye does not cause denaturation of its contents even when stored for a long period of time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A blow molded multilayered resin container used for holding contents containing an oxidation dye which comprises a moisture barrier layer having a water vapor transmission rate of 0.4 g·mm/(m²·d) or lower and an oxygen barrier layer having an oxygen transmission rate of 10 cm³·mm/(m²·d·MPa) or lower, the oxygen barrier layer being closer to the outside of the container than the moisture barrier layer.

2. A container according to claim 1, which has a nozzle at one end and a check valve mechanism fitted into the nozzle.

3. A container according to claim 2, wherein the check valve mechanism comprises a cylindrical main body and a disk-shaped valve whose outer diameter agrees with the inner diameter of the main body, the check valve being pivotally connected to the lower end of the inner wall of the main body, and the main body being insertion-fitted into the nozzle.

4. A container according to claim 1, wherein the moisture barrier layer comprises a cyclo olefin polymer, and the oxygen barrier layer comprises an ethylene-vinyl alcohol copolymer.

* * * * *

UNITED STATES PATENT AND TRADEMARK OFFICE
CERTIFICATE OF CORRECTION

PATENT NO. : 7,052,752 B2
APPLICATION NO. : 10/662507
DATED : May 30, 2006
INVENTOR(S) : Mitsugu Iwatsubo et al.

It is certified that error appears in the above-identified patent and that said Letters Patent is hereby corrected as shown below:

On the title page, Item (73), the Assignee information is incorrect. Item (73) should read:
-- (73) Assignees: Kao Corporation, Tokyo (JP),
Toyo Seikan Kaisha Ltd., Tokyo (JP) --

Signed and Sealed this

Fourteenth Day of November, 2006

JON W. DUDAS
*Director of the United States Patent and Trademark Office*